United States Patent
Tsukamoto et al.

(10) Patent No.: US 6,330,124 B1
(45) Date of Patent: Dec. 11, 2001

(54) MAGNETIC DISK DEVICE USING A CONTACT START STOP SYSTEM

(75) Inventors: Yuji Tsukamoto; Ken Ajiki, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/667,785

(22) Filed: Sep. 22, 2000

Related U.S. Application Data

(62) Division of application No. 08/991,557, filed on Dec. 16, 1997, now Pat. No. 6,181,503.

(30) Foreign Application Priority Data

Dec. 20, 1996 (JP) .................................................. 8-340779

(51) Int. Cl.$^7$ .................................................. G11B 5/41
(52) U.S. Cl. .................................... 360/75; 360/73.03
(58) Field of Search .................................... 360/75, 73.03, 360/74.1, 78.04, 128, 137

(56) References Cited

U.S. PATENT DOCUMENTS

| | | | |
|---|---|---|---|
| 4,987,502 | 1/1991 | Freeze | 360/75 |
| 5,371,637 | 12/1994 | Yamada | 360/75 |
| 5,424,884 | 6/1995 | Nonaka | 360/74.1 |
| 5,602,691 | 2/1997 | Iwabuchi | 360/75 |
| 5,793,553 | 8/1998 | Smith | 360/74.1 |
| 5,859,738 | 1/1999 | Forehand et al. | 360/75 |

FOREIGN PATENT DOCUMENTS

| | | |
|---|---|---|
| 62-97196 | 5/1987 | (JP) . |
| 63-52316 | 3/1988 | (JP) . |
| 63-239618 | 10/1988 | (JP) . |
| 1-185888 | 7/1989 | (JP) . |
| 3-86965 | 4/1991 | (JP) . |
| 3/225669 | 10/1991 | (JP) . |
| 4-111272 | 4/1992 | (JP) . |
| 4-134677 | 5/1992 | (JP) . |
| 4-291069 | 10/1992 | (JP) . |
| 5-54347 | 3/1993 | (JP) . |
| 5-166140 | 7/1993 | (JP) . |
| 5-210828 | 8/1993 | (JP) . |
| 6-52644 | 2/1994 | (JP) . |
| 6-203503 | 7/1994 | (JP) . |

OTHER PUBLICATIONS

Taki, "Magnetic Disk Drive," JP5–166140, Patent Abstracts of Japan, © 1993, JPO & Japio.

*Primary Examiner*—David Hudspeth
*Assistant Examiner*—James L Habermehl
(74) *Attorney, Agent, or Firm*—Sughrue, Mion, Zinn, Macpeak & Seas, PLLC

(57) ABSTRACT

It is an object of the present invention to improve reliability to a dust or the like of a magnetic disk device. The magnetic disk device of the present invention comprises a magnetic disk 10, a levitation type magnetic head slider 12 and a controller 14 for controlling an operation of the magnetic head slider 12 and the controller 14. The controller 14 moves the magnetic head slider 12 to a CSS (Contact Start Stop) region of the magnetic disk 10 at a predetermined time interval and performs a CSS operation at least once.

11 Claims, 5 Drawing Sheets

MAGNETIC DISK DEVICE USING A CONTACT START STOP SYSTEM

This is a divisional of application Ser. No. 08/991,557 filed Dec. 16, 1997, now U.S. Pat. No. 6,181,503, the disclosure of which is incorporated herein by reference.

BACKGROUND OF THE INVENTION

1. Field of the Invention

The present invention relates to a magnetic disk device such as a levitation type magnetic disk device using a levitation type magnetic head, a load/unload type magnetic disk device and a contact type magnetic disk device using a contact type magnetic head. In the following description, a magnetic head slider is simply called a "slider".

2. Description of the Related Art

A recent improvement of a memory density has been significant in a magnetic disk device. One factor for improving a line recording density of a magnetic recording is a reduction of a magnetic separation length (the magnetic separation length=a thickness of a magnetic disk protective film+a thickness of a magnetic disk lubricating film+an amount of magnetic disk levitation+a thickness of a slider protective film). In a conventional levitation type magnetic disk device, the magnetic disk device intends to improve the line recording density by reducing a levitation loss of a magnetic head to a limit. this is a contact type magnetic disk device using a contact type magnetic head.

Both of the protective film thickness and the amount of. levitation are reduced, thereby resulting in the reduction of reliability and longevity of the magnetic disk device with a mechanical contact slide. Thus devised is means for ensuring the reliability and longevity in even an environment wherein the protective film thickness and the amount of levitation are lower. One example is a load/unload type magnetic disk device as described in Japanese Patent Application Laid-open No. 1-185888/1989. Unlike the conventional magnetic disk device using a CSS (Contact Start Stop) system, the load/unload type magnetic disk device is provided with a mechanism for loading/unloading a levitation type magnetic head to a disk surface when the magnetic disk starts and stops rotating. This thereby intends to reduce a mechanical damage caused between the magnetic head and the magnetic disk during the CSS operation which the conventional magnetic disk device suffers from.

In the conventional magnetic disk device using the CSS system, attention is also paid to a reliability technique in which drive states of the device (the CSS operation and seek operation) are controlled in consideration of its operating condition whereby the technique attempts to improve the device longevity.

For example, in the technique disclosed in Japanese Patent Application Laid-open No. 6-52644/1994, Japanese Patent Application Laid-open No. 4-134677/1992, Japanese-Patent Application Laid-open No. 4-111272/1992 and Japanese Patent Application Laid-open No. 63-239618/1988, the CSS operation is controlled whereby the reliability is improved.

In the technique disclosed in Japanese Patent Application Laid-open No. 6-52644/1994 and Japanese Patent Application Laid-open No. 4-111272/1992, two regions for the CSS operation are disposed on the magnetic disk. The mechanical damage, which typically focuses on a single CSS region, is distributed into two CSS regions whereby this technique attempts to improve the longevity. In the technique disclosed in Japanese Patent Application Laid-open No. 4-134677/1992, the CSS operation is performed on an optional position all over the magnetic disk surface so as to distribute the damage all over the disk surface whereby the reliability is improved. In the technique disclosed in Japanese Patent Application Laid-open No. 63-239618/1988, when the magnetic disk is not rotated, the magnetic head is stopped in the region where a surface roughness of the magnetic disk is significant. The magnetic head is moved to the smooth region of the magnetic disk prior to the rotation, where the CSS operation is performed. This prevents the magnetic head and magnetic disk from contacting each other when the magnetic disk is not rotated. Furthermore, the magnetic head is started in the smooth region whereby a good CSS specific value can be obtained.

In the technique disclosed in Japanese Patent Application Laid-open No. 4-291069/1992, the number of rotation of the magnetic disk is changed except during a recording/reproduction, that is, when no access is given to the magnetic disk. The amount of slider levitation during no access is larger than the amount of slider levitation during the recording/reproduction, whereby the technique intends to reduce a probability of contact slide. More specifically, when a floating dust in the device is present in a levitation space, the damage resulted from the contact slide is reduced.

In the technique disclosed in Japanese Patent Application Laid-open No. 3-225669/1991, when the number of rotation of the magnetic disk is the number of steady rotation or less, that is, in a state before the slider reaches to a complete levitation with respect to the magnetic disk, the seek operation is performed. The dust adhering to the magnetic head and the magnetic disk is removed, whereby the technique intends to improve the reliability. Other means for improving the reliability by the seek operation is the seek operation during the no access which is already incorporated in the actual magnetic disk device. When a non-access state is continued in a predetermined time interval during a rotating operation of the magnetic disk device, the seek operation is automatically performed. A specified disk diameter reduces the probability that the disk is subject to the continuous contact slide for a long time. The seek operation also intends to remove the dust adhering to the magnetic head.

The technique for intending to improve the reliability of the load/unload type magnetic disk device is a system which considers a load/unload timing chart as described in Japanese Patent Application Laid-open No. 6-203503/1994. In this load/unload type magnetic disk device, a load operation is performed from the time when a tangential force acting on the magnetic head is maximum to the time immediately before it is minimum. An unload operation is performed from the time immediately after the tangential force restarts to increase to the time when the tangential force is again maximum, whereby the damage is prevented and a deposit on the head is removed.

SUMMARY OF THE INVENTION

In any one of a levitation type magnetic disk device using a CSS system, the levitation type magnetic disk device using a load/unload system and a contact type magnetic disk device using a contact type magnetic head, a deterioration of recording/reproducing characteristics caused by an adhesion of deposit to a magnetic head and a deterioration of slider levitation characteristics or characteristics during a contact slide are important problems to be solved in order to ensure reliability of the magnetic disk device. More specifically, a conventional complete levitation system is replaced by the levitation type magnetic disk device using a recording system with an intermittent contact slide generally referred to as a near contact and the contact type magnetic disk device using a continuous contact slide, a so-called contact recording system.

In these devices, increased is a probability that, besides the dust (referred to as a primary dust) which is previously present in the magnetic disk device prior to a device operation, a dust (secondary dust) is produced due to the intermittent or continuous contact slide between the magnetic head and the magnetic disk during the device operation. A problem about the device reliability associated with the dust is more serious.

The following four methods are means for overcoming the reliability problem caused by that the dust adheres to a head element portion and an air bearing surface of the slider.

1) Suppressed is a posterior dust generation caused by the contact slide of the magnetic head/the magnetic disk.
2) The slider is constructed so that the dust may have little tendency to adhere onto the air bearing surface of the head element portion of the slider.
3) The slider is formed in shape so that the levitation characteristics may not tend to change even if the dust adheres onto the air bearing surface of the slider.
4) The dust adhering to the slider is removed by the operation such as a CSS operation, a seek operation or a magnetic disk rotation start operation.

The load/unload type magnetic disk device is a typical example of means for suppressing the posterior dust generation resulted from the contact slide of the magnetic head/magnetic disk described in 1). A load/unload mechanism prevents the dust generation caused by the contact slide of the CSS operation applied to the conventional magnetic disk device. However, the CSS operation is a cause of the dust generation and has a dust removing effect. Therefore, once the primary and secondary dusts adhere onto the head air bearing surface of the device employing the load/unload mechanism, there is disadvantageously a high probability that the dust remains without being removed. A method of solving the problem of this load/unload mechanism is a system considering a load/unload timing chart as described in Japanese Patent Application Laid-open No. 6-203503/1994. In this load/unload type magnetic disk device, a load operation is performed from the time when a tangential force acting on the magnetic head is maximum to the time immediately before it is minimum. An unload operation is performed from the time immediately after the tangential force restarts to increase to the time when the tangential force is again maximum. This causes a problem in that a dust generation preventing effect which is an advantage of the load/unload system is lost.

In the conventional magnetic disk device using the CSS system, the following problems also arise as regards a reliability improving technique for attempting to improve a device longevity by controlling the CSS operation and the seek operation.

In the technique disclosed in Japanese Patent Application Laid-open No. 6-52644/1994 and Japanese Patent Application Laid-open No. 4-111272/1992, as described above, an occupied area of CSS region on the entire disk is increased. The severest problem is thus that a memory capacity of the magnetic disk device is reduced.

As disclosed in Japanese Patent Application Laid-open No. 4-134677/1992, the technique, in which the CSS operation is performed on an optional position all over the magnetic disk surface, involves a serious difficulty in its application for the following reasons. The magnetic disk has been recently changed from a whole surface texture structure wherein a flaw referred to as a texture is formed all over the disk surface to a zone texture structure wherein the CSS region alone is roughened and a data region for a recording/reproduction is as smooth as possible. A zone texture medium is the magnetic disk in which, in order to prevent a contact between the magnetic head and the magnetic disk, the CSS region alone is roughened and the data region is provided with smooth surface characteristics advantageous to the improvement of recording density (the reduction of an amount of levitation). The use of the zone texture medium makes it impossible to distribute the CSS region all over the disk surface.

The technique disclosed in Japanese Patent Application Laid-open No. 63-239618/1988 is highly risky in that a level of damage to the magnetic disk is extremely high. The fact that a friction coefficient is reduced with a speed is known. Therefore, if the seek operation is performed, that is, if the magnetic head is moved when the magnetic disk is not rotated, the magnetic head is slid in contact. In this case, the amount of levitation of the magnetic head is 0, that is, the magnetic head is in a complete contact state and has a high friction coefficient. A flaw referred to as a scratch is thus formed on the slider and the magnetic disk surface. Furthermore, the scratch formation produces a powder by an abrasion. This powder produced by the abrasion makes a slide state more severe. In the worst case, the recording/reproduction is thus impossible. Moreover, the friction coefficient is higher and slider is adhered when the magnetic head is moved. Thus, in some cases, a gimbal spring and a suspension bonding the slider are deformed, and the levitation type magnetic head does not function at all.

The technique disclosed in Japanese Patent Application Laid-open No. 4-291069/1992 is considered as effective means for the magnetic head in which the amount of levitation is increased with the number of rotation. However, the recent slider is designed so that the amount of levitation of the slider may depend as little as possible on a disk peripheral speed (disk diameter) and a Yaw angle of the magnetic head and the constant amount of levitation may be always obtained in order to achieve a stabilization of recording/reproducing characteristics. That is, in case of many recent levitation type sliders, even if the number of disk rotation is changed to some extent, the amount of levitation is scarcely changed. Furthermore, when the number of disk rotation is increased, a temperature extremely rises in the magnetic disk device due to a windage loss. Thus, there may be arisen another problem such as a servo abnormality caused due to the temperature rise. Moreover, another cooling mechanism is required for attempting to suppress the temperature rise, thereby resulting in the increase of manufacturing cost. For the above reason, the means for increasing the amount of levitation of the magnetic head by the number of rotation of the magnetic disk is actually inapplicable.

Japanese Patent Application Laid-open No. 3-225669/1991 discloses a reliability improving method in which the seek operation is used so as to remove the adhering dust. This method involves a problem in that a dust removing effect is insufficient as described below. Furthermore, as described below, a keen study makes it clear that the removal of deposit on the slider air bearing surface by the CSS operation is more highly effective than the removal by the seek operation.

Described above are the problems of known examples relating to the system for improving the reliability of the magnetic disk device by the CSS and seek operations. The fact that the removal of deposit by the CSS operation is more effective is also previously described.

However, the removal of deposit on the head by the CSS operation cannot be applied to all the magnetic disk devices. The magnetic disk device can be generally classified into two kinds depending on its use condition. One is the magnetic disk device connected to a personal computer. Most of this kind of magnetic disk device performs a start/stop operation once per day. It can be therefore expected that the deposit on the magnetic head is removed by the CSS operation at least once per day. However, the magnetic disk device connected to a large-sized computer referred to as a main frame represented by a bank on-line system is not stopped except for a long-term suspension of business operation and a maintenance period but is in a continuous operating state. Therefore, it is difficult to expect the removal of deposit by the CSS operation. An introduction of some head deposit removing mechanism is thus required. More specifically, when the long-time continuously operating magnetic disk device such as the latter adopts a near contact recording system or a contact recording system in an intermittent or continuous contact slide state, the slider is prone to a contamination with a high probability even during the operation. Therefore, the adoption of the head deposit removing mechanism is essential.

The above and other objects, features and advantages of the present invention will become apparent from the following description based on the accompanying drawings which illustrate an example of a preferred embodiment of the present invention.

BRIEF DESCRIPTION OF THE DRAWINGS AND TABLES

Table 1 shows test conditions of examples 1–24.

Table 2 shows the test conditions of the examples 25–39.

Table 3 shows the test conditions of the examples 40–44 and the comparative examples 1–18.

Table 4 shows test results of the examples 1–34.

Table 5 shows the test results of the examples 35–44 and the comparative examples 1–18.

DETAILED DESCRIPTION OF THE PREFERRED EMBODIMENTS

Figure 1:
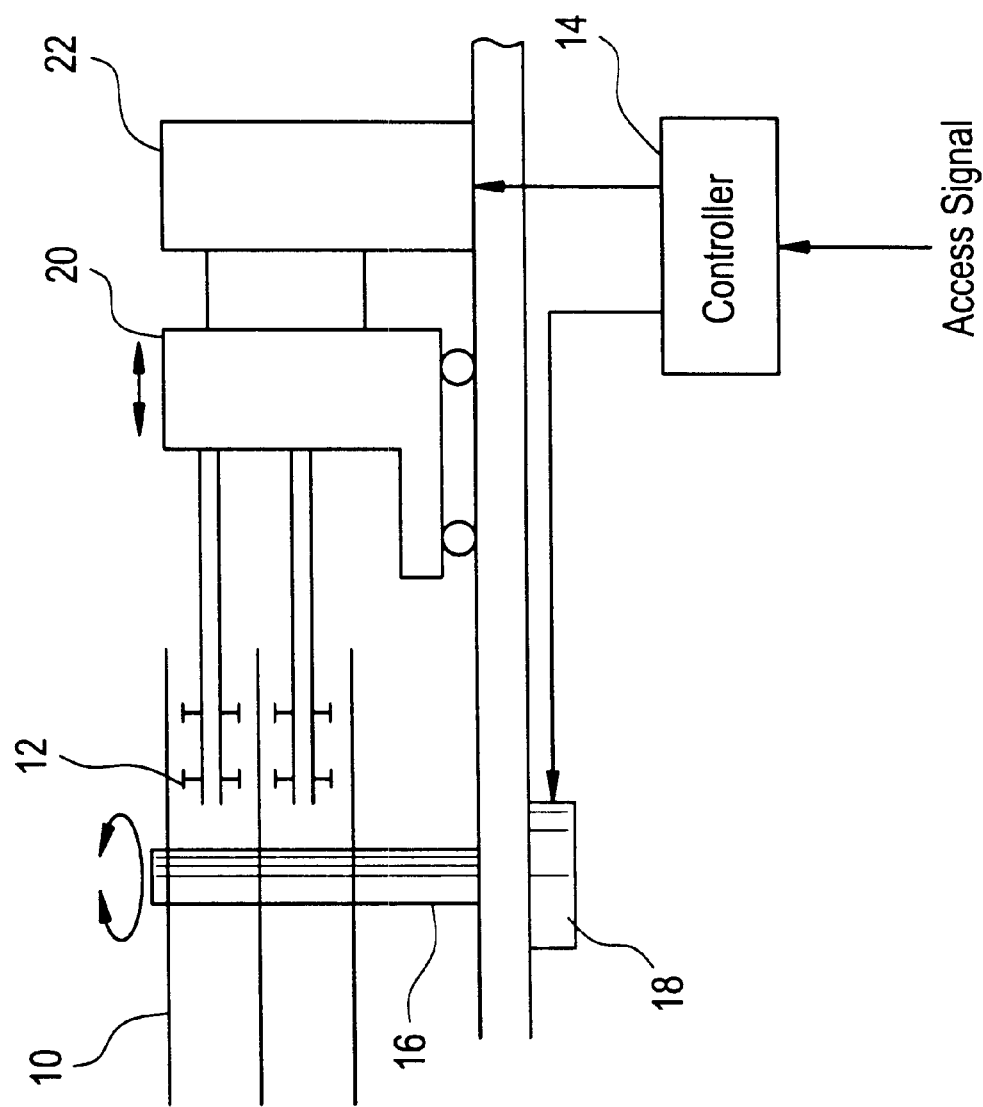
FIG. 1 is a schematic arrangement diagram showing an example of a magnetic disk device according to the present invention.

FIG. 1 is a schematic arrangement diagram showing an example of a magnetic disk device according to the present invention. The magnetic disk device of the present invention comprises a magnetic disk 10, a slider 12 and a controller 14. The magnetic disk 10 is fixed by a spindle 16 and rotated at high speed by a rotating motor 18. The slider 12 incorporates a magnetic head therein. The slider 12 is fixed by a carriage 20 and positioned by a positioner 22. The controller 14 comprises an electronic circuit. The controller 14 controls an operation of the magnetic disk 10 and the slider 12 through the rotating motor 18 and the positioner 22 in accordance with an external access signal.

In more detail, the magnetic disk device of the present invention includes a levitation type magnetic disk device using a CSS system, the levitation type magnetic disk device using a load/unload system and a contact type magnetic disk device. The device is characterized by that, when no access is given to the magnetic disk device in a predetermined time interval, the slider is moved to a CSS region of the magnetic disk so as to perform a CSS operation at least once. The device is also characterized by that the above-described predetermined time interval is 24 hours or more. By performing the aforementioned operation, a contaminant adhering to an air bearing surface and a head element portion of the slider is removed. The device intends to improve reliability of recording/reproduction and mechanical durability.

Next, a function of the magnetic disk device of the present invention will be described. The single-disk type magnetic disk device comprises the magnetic head of a minimum amount of levitation of 30 nm and the 2.5-inch magnetic disk of a medium glide height of 30 nm (where a single magnetic disk and two magnetic heads are mounted in this magnetic disk device). An acoustic emission sensor (hereinafter referred to as an AE sensor) is fitted in a head carriage portion of this magnetic disk device. A contact slide state between the magnetic head and the magnetic disk is observed by a voltage signal sent from the AE sensor. It should be noted that an increase of the AE voltage signal corresponds to a shift to a severer contact behavior. Here, a glide height means the amount of levitation allowed by the magnetic disk because of an unevenness such as a surface roughness of the magnetic disk. In the magnetic disk of the glide height of 30 nm, the magnetic head whose minimum amount of levitation is more than 30 nm is in a levitation state. On the other hand, the magnetic head whose minimum amount of levitation is 30 nm or less is at least in an intermittent contact slide state. A combination of the magnetic head and the magnetic disk having the same minimum amount of levitation and glide height is in a state of boundary between the contact slide and the levitation.

Figure 2:
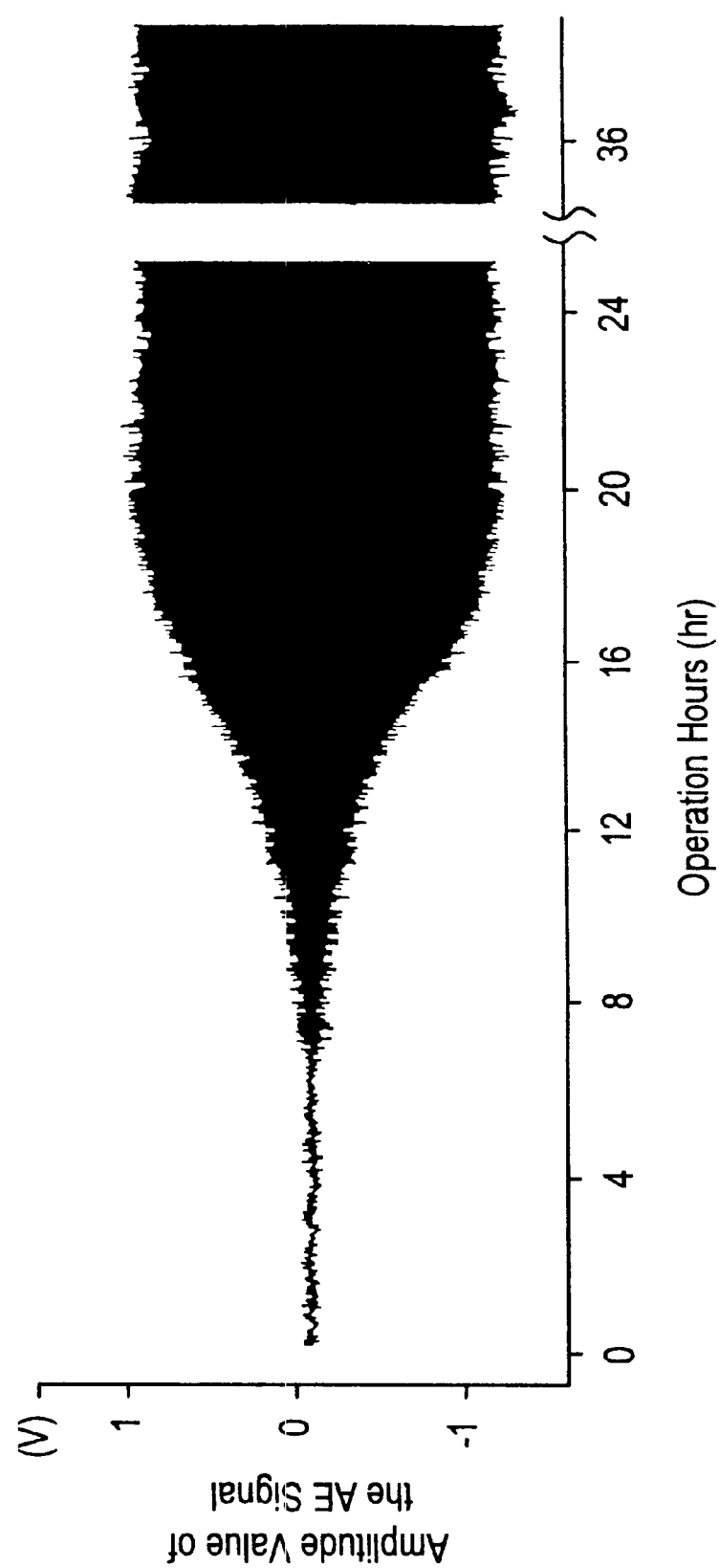
FIG. 2 is a wave form chart, wherein a change with time in a contact slide state is verified based on an AE signal when a magnetic head is positioned on a predetermined radius in a recording/reproducing region without using a reliability improving operation.

FIG. 2 shows a result brought by that the AE signal is continuously measured after the operation of the above-described disk device. In the operation state, after the first CSS operation, the head element is positioned on a radius of 25 mm. When the magnetic head is stopped there, the AE signal is measured. An amplitude value of the AE signal is gradually increased after elapse of 5 hours of the operation. After about 18 hours, the amplitude value reaches to a maximum value, and then it is saturated with a substantially constant value. This means the following fact. That is, since a deposit which is levitated just after the operation is gradually formed on the magnetic head, the change in levitation attitude due to the deposit causes the reduction of the amount of levitation. This results in that the state is gradually shifted to the severer contact slide state.

Figure 3:
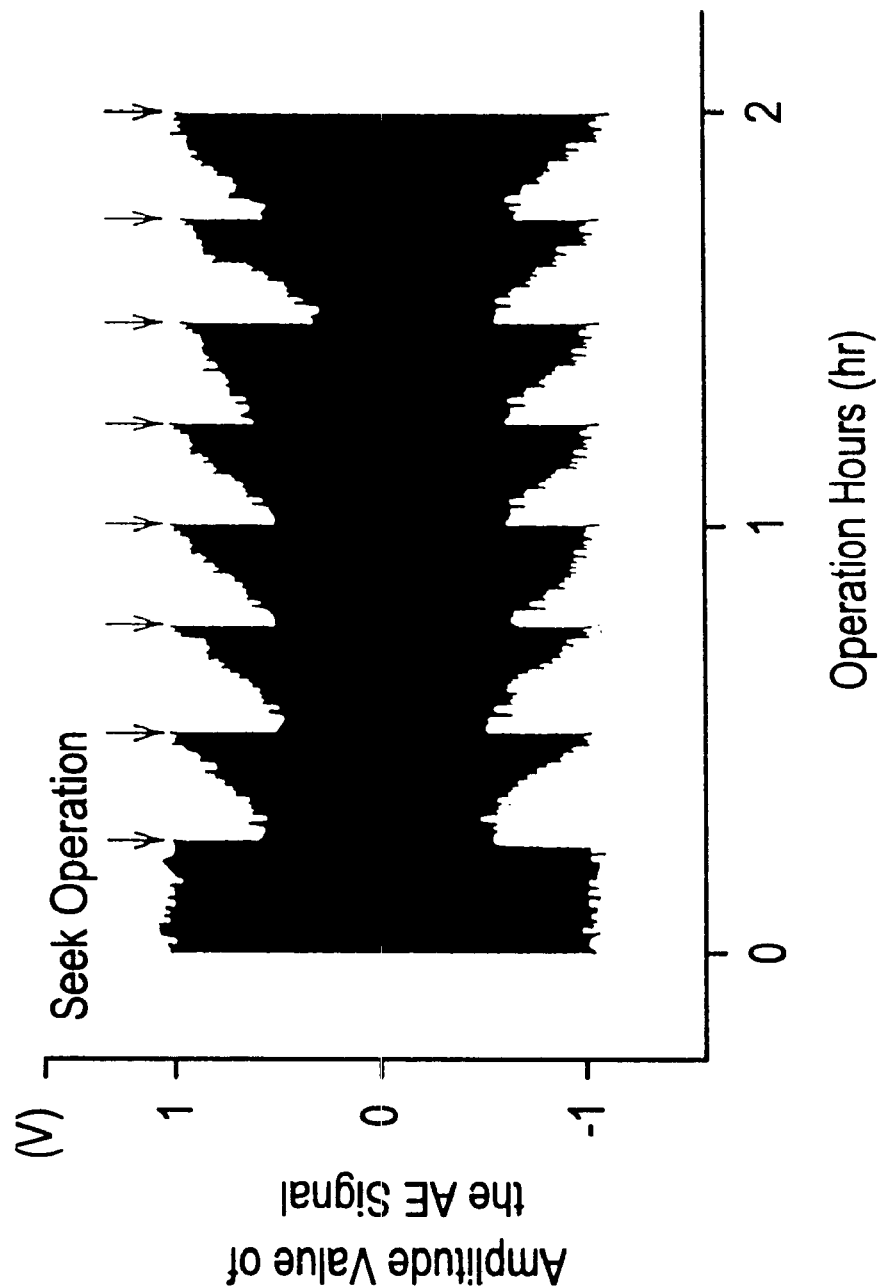
FIG. 3 is a wave form chart, wherein the change with time in the contact slide state is verified based on the AE signal when a random seek operation, which is one of the conventional reliability improving operations and is performed once per 15 minutes, is added.

FIG. 3 shows the change with time in the AE signal. In this case, when the amplitude value of the AE signal is saturated with the maximum value, a random seek operation (the operation is that the magnetic head is moved at random all over a recording/reproducing region of the magnetic disk) is additionally performed once per 15 minutes on the magnetic head. After the seek operation, the amplitude value is reduced to about ½. However, the amplitude value is not restored to the AE amplitude value in the levitation state. Furthermore, after elapse of 2 minutes of the seek operation, the AE amplitude value restarts to increase. It is seen that the amplitude value is returned to a substantially saturated value just before the subsequent random seek operation. This means the following fact. That is, since a deposit removing effect by the random seek operation is insufficient, the amplitude value is not restored to the value in the levitation state. This results in that the state is shifted to the severer contact slide state for a short time.

Figure 4:
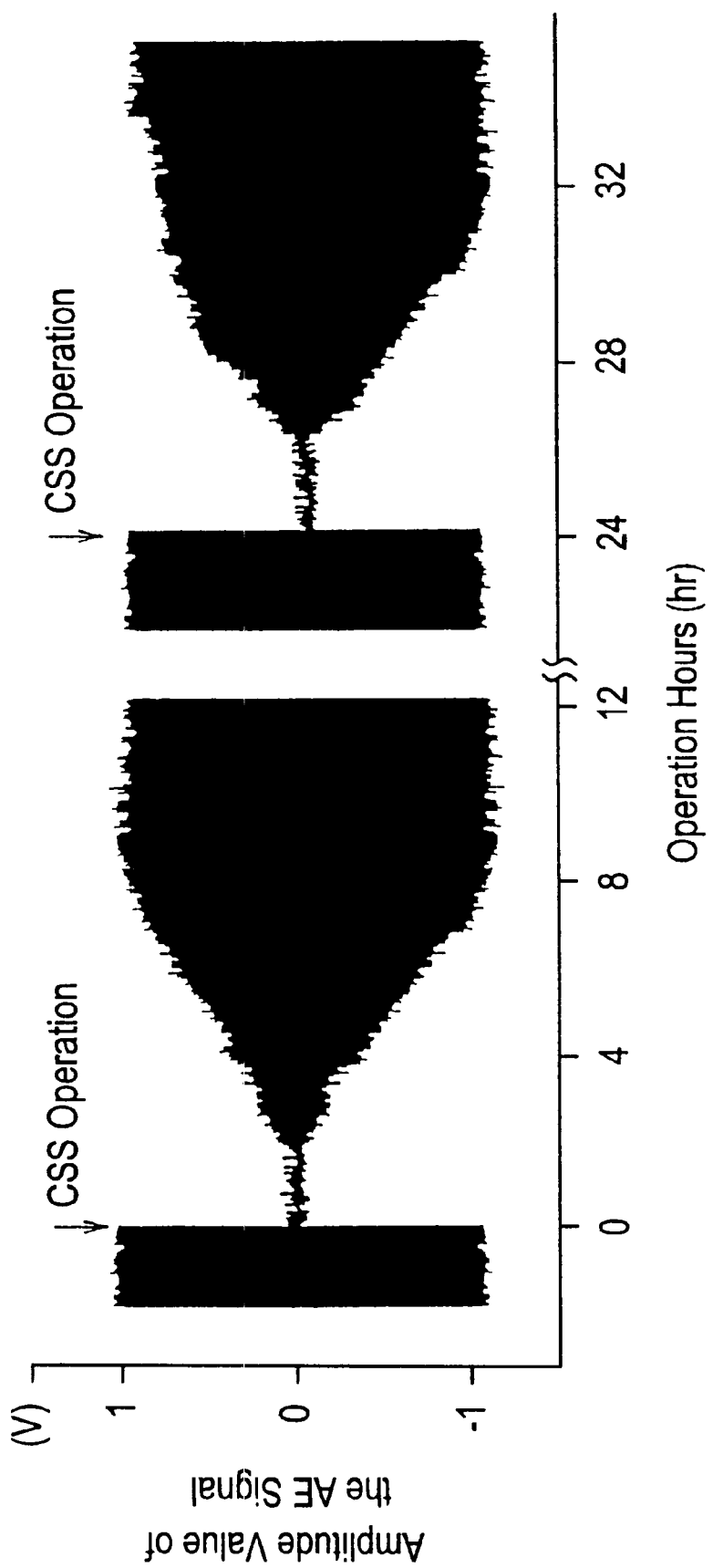
FIG. 4 is a wave form chart, wherein the fact that the contact slide state is restored by a CSS operation which is one of the reliability improving operations of the present invention is verified based on the AE signal.

FIG. 4 shows the change with time in the AE signal. In this case, when the AE signal amplitude value is saturated with the maximum value, the magnetic head is moved to the CSS region and then the CSS operation is carried out once. The CSS operation allows the AE signal value to be restored to the amplitude value corresponding to the substantial levitation state. After about 2 hours, the AE amplitude value starts to increase. After about 10 hours, the amplitude value is saturated with the maximum value. It is seen that the CSS operation has the better deposit removing effect than the seek operation and the state is thus restored to the levitation state. However, the CSS operation does not have the effect in which the slider is cleaned to an initial clean state. As seen from the comparison with FIG. 2, the time required for that the AE signal starts to increase and the time required for that the amplitude value is reached to and saturated with the maximum value are reduced to about ½.

Figure 5:
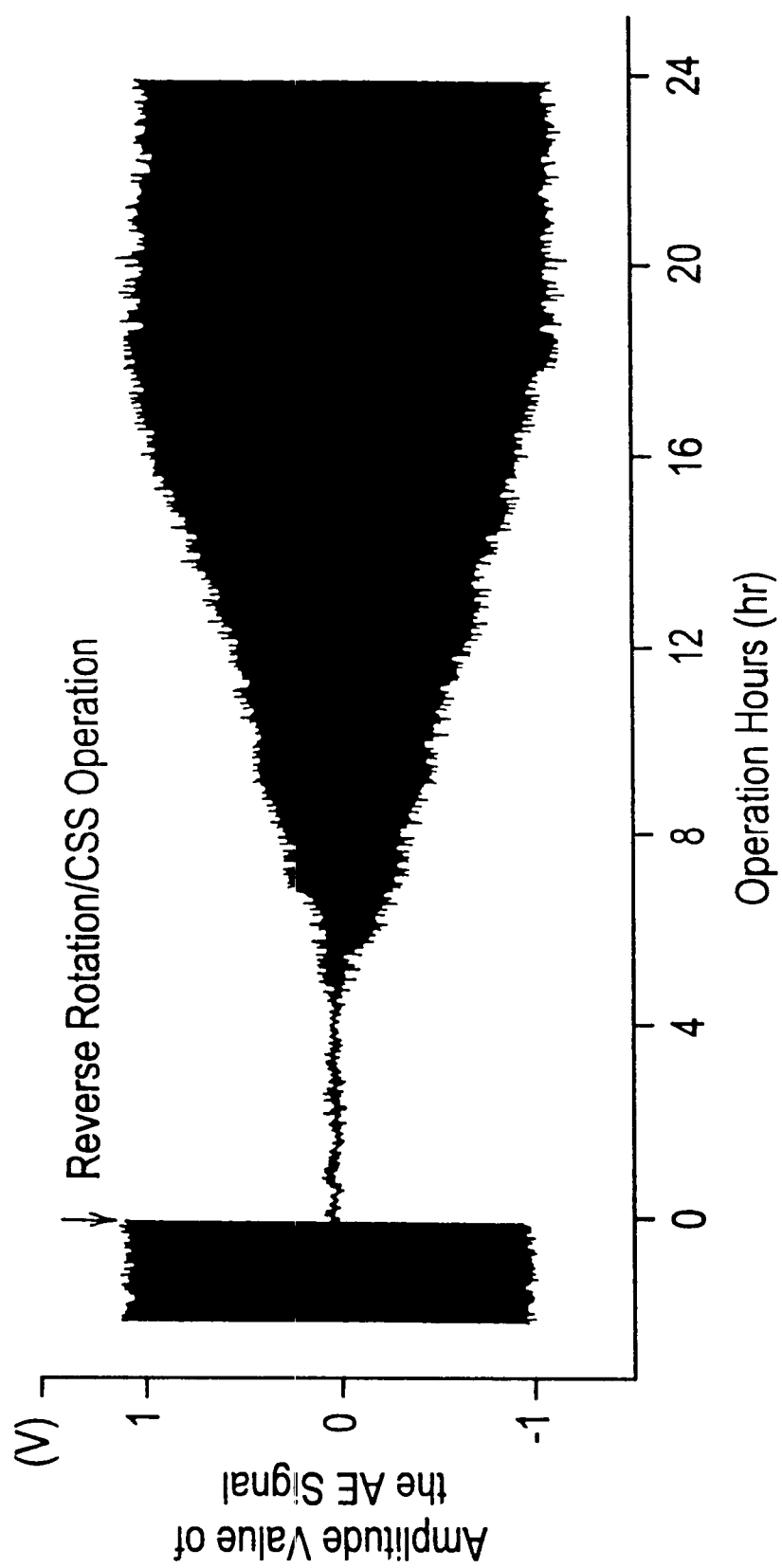
FIG. 5 is a wave form chart, wherein the fact that the contact slide state is restored by a combination operation of the CSS operation and a reverse rotation which is one of the reliability improving operations of the present invention is verified based on the AE signal.

FIG. 5 shows the change with time in the AE signal. In this case, when the AE signal amplitude value is saturated with the maximum value, the magnetic head is moved to the CSS region and is reversely rotated (hereinafter referred to as a reverse rotation) at low speed by an amount corresponding to a slider length or less prior to the rotation of the magnetic disk, and then the CSS operation is performed once. The reverse rotation and the CSS operation permit the AE signal value to be restored to the amplitude value corresponding to the complete levitation state. The AE amplitude value starts to increase after 5 hours. The AE amplitude value is saturated with the maximum value after about 17 hours. The combination operation of the reverse rotation and CSS operation has the better deposit removing effect than the CSS operation. It is seen that the change with time in the AE signal after the combination operation is similar to the change of the magnetic head in the initial clean state shown in FIG. 2. The step of removing the deposit by the reverse rotation is described below.

The air bearing surface of the slider is worked so that it may be a convex surface in shape referred to as a crown in order to prevent the absorption. When the magnetic disk is stopped, this crown shape allows the magnetic head to be in contact with an approximately flat portion of the crown shape, that is, the center of the slider. The reverse rotation permits the removal of the contaminant on the surface ranging from the center of the slider to an air flow inlet end. On the other hand, the CSS operation permits the removal of the contaminant on the surface ranging from the center of the slider to an air flow outlet end. Therefore, the reverse rotation/CSS combination operation allows the deposit to be removed over the wider surface, compared to the CSS operation.

Besides the above-described operation, the following operations are examined: 1) a seek/CSS combination operation wherein the random seek operation is additionally performed once per 15 minutes on the magnetic head, the magnetic head is moved to the CSS region once per 24 hours and the CSS operation is performed once, and 2) a seek/reverse rotation/CSS combination operation wherein the random seek operation is additionally performed once per 15 minutes on the magnetic head, the magnetic head is moved to the CSS region once per 24 hours, the head is reversely rotated at low speed before the rotation of the magnetic disk and then the CSS operation is performed once.

The comparative merits of the operations in the deposit removing effect are judged from a tendency of the change with time in the AE signal as described below. The seek/reverse rotation/CSS combination operation and the reverse rotation/CSS combination operation are substantially equal to each other and are the most excellent. The seek/CSS combination operation and the CSS combination operation are substantially equal to each other and have the second excellent effect. The seek operation alone has the least removing effect.

In the first place, the matters common to all the examples will be described. The examined device is the 2.5-inch magnetic disk device wherein a single magnetic disk of a diameter of 2.5 in. is mounted and the two magnetic heads are arranged opposite to both the surfaces of the magnetic disk.

As the examples, four kinds of magnetic disks, magnetic disk numbers AlZ, AlT, AlN and GlN are used. For the disk AlZ, used is an Al alloy base having a zone texture structure in which the CSS region has the significant surface roughness and the recording/reproducing region has the small surface roughness. This CSS region has the glide height of 38 nm. The recording/reproducing region has the glide height of 25 nm. For the disk AlT, used is the Al alloy base having a texture structure all over the disk surface. This disk has the glide height of 30 nm. The disks AlZ and AlT are used for the CSS type magnetic disk device. For the disk AlN, used is the smooth Al alloy base which the intentional texture is not formed on. This disk has the glide height of 20 nm. The disk AlN is used for the load/unload type magnetic disk device. The disks AlZ, AlT and AlN have a film structure containing a fluoro-group lubricant of 2 nm, a sputter carbon protective film of 15 nm, a CoCrTaPt magnetic film of 20 nm, a Cr base film of 50 nm, an NiP-plated base layer of 10 mm and the Al alloy base. For the disk GlN, used is a smooth glass base which the intentional texture is not formed on. This disk has the glide height of 15 nm. The disk GlN is used for the contact type magnetic disk device. The disk GlN has the film structure containing a fluoro-group lubricant of 5 nm, a sputter carbon protective film of 10 nm, a CoCrTaPt magnetic film of 100 nm and the smooth glass base.

Three kinds of magnetic heads, that is, magnetic head numbers HFH, LFH and CST are used as the examples. The head HFH has the minimum amount of levitation of 30 nm. The slider is a negative pressure type slider dimensioned 50% or in size referred to as nano. The head LFH has the minimum amount of levitation of 20 nm. The slider is the negative pressure type slider dimensioned 50% or in size referred to as nano. The heads HFH and LFH carry the thin film magnetic head with a suspension load of 2.5 g. The heads HFH and LFH are used for the levitation type magnetic disk device employing the CSS system or the load/unload system. The CST is the contact type magnetic head. In this type of head, three contact pads are pressed on the magnetic disk surface, whereby the contact slide state is achieved. The slider is dimensioned 30% or in size referred to as pico. The head CST carries the thin film magnetic head with a suspension load of 0.2 g. The head CST is used for the contact type magnetic disk device.

Tables 1 through 3 show the magnetic disks and the magnetic heads for use in the examples and comparison samples.

Tables 1 through 3 also show Δ, the type of the magnetic disk device and the operation for reliability improvement. Δ is defined as (Δ=the minimum amount of head levitation−the glide height of the recording/reproducing region). This is an index indicative of whether the magnetic head is in a levitation state or a near contact state with respect to the disk surface when the magnetic head having ensured initial levitation characteristics in the clean state is positioned in the recording/reproducing region. When Δ is plus, the magnetic head is in the levitation state. When Δ is minus, the magnetic head is in the near contact state with the intermittent contact slide. When Δ is plus, as its absolute value is larger, the head is in the safer levitation state. When Δ is minus, as its absolute value is larger, the head is in the near contact state with the higher probability of contact slide. As regards the type of the magnetic disk device, the CSS type is represented by CSS, the load/unload type is represented by LOAD and the contact type magnetic disk device is represented by CON.

For example, an example 1 is a CSS/levitation type magnetic disk device having a levitation margin of 5 nm wherein the AlZ and the HFH are used as the magnetic disk and the magnetic head, respectively. When 24 hours pass in the non-access state as the reliability improving operation, the magnetic head is moved to the CSS region so as to perform the CSS operation once. The reverse rotation is one of the reliability improving operations. The reverse rotation is accomplished by, during the start of the magnetic disk device, rotating the magnetic disk at speed of 1 mm/sec by an angle corresponding to about 0.5 mm in terms of a circumference of the CSS region in a direction opposite to a direction of normal rotation. The magnetic disks, magnetic heads, device types and reliability improving operations are changed as shown in Tables 1 through 3 so as to make the magnetic disk devices of examples 2 through 44.

Although comparison examples 1 through 4 are similar to the examples 1 through 4, respectively, in the device arrangement, they are the magnetic disk devices which do not adopt the reliability improving operation. The magnetic disks, magnetic heads and device types are changed as shown in Tables 1 through 3 so as to make the magnetic disk devices of comparison examples 5 through 18. The random seek operation performed once per 15 minutes is the conventional reliability improving operation. This random seek operation is applied to the comparison examples as shown in Tables 1 through 3.

The total 62 kinds of magnetic disk devices of the examples 1 through 44 and the comparison examples 1 through 18 are used. The 62 devices are allowed to stand for 8 weeks in the operating/non-access states in a high-temperature/high-humidity environment at a temperature of 60 and a relative humidity of 70%. Error rates (prior to an error correction) are measured before and after a shelf test, whereby the effects of the reliability improving operations are compared to one another. Tables 4 and 5 show the error rates before and after the shelf test. X denotes the devices whose error rates cannot be measured after the shelf test since the magnetic head and the medium are seriously damaged during the shelf test.

In the comparison examples, the error rate cannot be measured after the test in the near contact and contact type magnetic disk devices which exhibit the value Δ of minus. Even in case of the magnetic disk device whose error rate can be measured, the error rate after the test is increased at least six times as much as the error rate before the test. On the other hand, in the magnetic disk devices of the examples 1 through 44 using the reliability improving operation of the present invention, all the error rates can be measured even after the test. It is seen that the increase of error rate after the test is suppressed to twice or less.

According to the present invention, a novel reliability improving operation can ensure the removal of the deposit formed on the slider. Therefore, it is possible to prevent the contamination of magnetic head element and the deterioration of slider levitation characteristics. The highly reliable magnetic disk device can be thus provided.

It is to be understood, however, that although the characteristics and advantages of the present invention have been set forth in the foregoing description, the disclosure is illustrative only, and changes may be made in the arrangement of the parts within the scope of the appended claims.

TABLE 1

| SAMP NUM | DISK | HEAD | Δ(nm) | DEVICE | RELIABIL. IMPROV. OPERATA. |
|---|---|---|---|---|---|
| Ex. | | | | | |
| 1 | AlZ | HFH | +5 | CSS | 1 GSS OPE/24H |
| 2 | AlZ | LFH | −5 | CSS | 1 CSS OPE/24H |
| 3 | AlT | HFH | 0 | CSS | 1 CSS OPE/24H |
| 4 | AlT | LFH | −10 | CSS | 1 CSS OPE/24H |
| 5 | AlZ | HFH | +5 | CSS | 1 CSS OPE/36H |
| 6 | AlZ | LFH | −5 | CSS | 1 CSS OPE/36H |
| 7 | AlT | HFH | 0 | CSS | 1 CSS OPE/36H |
| 8 | AlT | LFH | −10 | CSS | 1 CSS OPE/36H |
| 9 | AlN | HFH | +10 | LOAD | 1 CSS OPE/24H |
| 10 | AlN | LFH | 0 | LOAD | 1 CSS OPE/24H |
| 11 | AlN | HFH | +10 | LOAD | 1 CSS OPE/36H |
| 12 | AlN | LFH | 0 | LOAD | 1 CSS OPE/36H |
| 13 | GIN | CST | | CONT | 1 CSS OPE/24H |
| 14 | GIN | CST | | CONT | 1 CSS OPE/36H |
| 15 | AlZ | HFH | +5 | CSS | 1 Re CSS OPE/24H |
| 16 | AlZ | LFH | −5 | CSS | 1 Re CSS OPE/24H |
| 17 | AlT | HFH | 0 | CSS | 1 Re CSS OPE/24H |
| 18 | AlT | LFH | −10 | CSS | 1 Re CSS OPE/24H |
| 19 | AlN | HFH | +10 | LOAD | 1 Re CSS OPE/24H |
| 20 | AlN | LFH | 0 | LOAD | 1 Re CSS OPE/24H |
| 21 | AlN | HFH | +10 | LOAD | 1 Re CSS OPE/36H |
| 22 | AlN | LFH | 0 | LOAD | 1 Re CSS OPE/36H |
| 23 | GIN | CST | | CONT | 1 Re CSS OPE/24H |
| 24 | GIN | CST | | CONT | 1 Re CSS OPE/36H |

TABLE 2

| SAMP NUM | DISK | HEAD | Δ(nm) | DEVICE | RELIABIL. IMPROV. OPERATA. |
|---|---|---|---|---|---|
| Ex. | | | | | |
| 25 | AlZ | HFH | +5 | CSS | 1Ra Se Op/ 15M.1CSS/24H |
| 26 | AlZ | LFH | −5 | CSS | 1Ra Se Op/ 15M.1CSS/24H |
| 27 | AlT | HFH | 0 | CSS | 1Ra Se Op/ 15M.1CSS/24H |
| 28 | AlT | LFH | −10 | CSS | 1Ra Se Op/ 15M.1CSS/24H |
| 29 | AlN | HFH | +10 | LOAD | 1Ra Se Op/ 15M.1CSS/24H |
| 30 | AlN | LFH | 0 | LOAD | 1Ra Se Op/ 15M.1CSS/24H |
| 31 | AlN | HFH | +10 | LOAD | 1Ra Se Op/ 15M.1CSS/36H |

TABLE 2-continued

| SAMP NUM | DISK | HEAD | Δ(nm) | DEVICE | RELIABIL. IMPROV. OPERATA. |
|---|---|---|---|---|---|
| 32 | AIN | LFH | 0 | LOAD | 1Ra Se Op/15M.1CSS/36H |
| 33 | GIN | CST |  | CONT | 1Ra Se Op/15M.1CSS/24H |
| 34 | GIN | CST |  | CONT | 1Ra Se Op/15M.1CSS/36H |
| 35 | AIZ | HFH | +5 | CSS | 1Ra Se Op/15M.1ReCSS/24H |
| 36 | AIZ | LFH | −5 | CSS | 1Ra Se Op/15M.1ReCSS/24H |
| 37 | AIT | HFH | 0 | CSS | 1Ra Se Op/15M.1ReCSS/24H |
| 38 | AI% | LFH | −10 | CSS | 1Ra Se Op/15M.1ReCSS/24H |
| 39 | AIN | HFH | +10 | LOAD | 1Ra Se Op/15M.1ReCSS/24H |

CONT . . . Contact Type
Re CSS OPE . . . Reverse Revolution CSS Operation
Ra CSS OP . . . Randam Seek Operation

TABLE 3

| SAMP NUM | DISK | HEAD | Δ(nm) | DEVICE | RELIABIL. IMPROV. OPERATA. |
|---|---|---|---|---|---|
| 40 | AIN |  | 0 | LOAD | 1Ra Se Op/15M.1ReGSS/24H |
| 41 | AIN |  | +10 | LOAD | 1Ra Se Op/15M.1ReCSS/36H |
| 42 | AIN |  | 0 | LOAD | 1Ra Se Op/15M.1ReCSS/36H |
| 43 | GIN |  |  | CONT | 1Ra Se Op/15M.1ReCSS/24H |
| 44 | GIN |  |  | CONT | 1Ra Se Op/15M.1ReCSS/36H |
| Co. Ex. |  |  |  |  |  |
| 1 | AIZ | HFH | +5 | CSS |  |
| 2 | AIZ | LFH | −5 | CSS |  |
| 3 | AIT | HFH | 0 | CSS |  |
| 4 | AIT | LFH | −10 | CSS |  |
| 5 | AIZ | HFH | +5 | CSS | 1Ra Se Op/15M. |
| 6 | AIZ | LFH | −5 | CSS | 1Ra Se Op/15M. |
| 7 | AIT | HFH | 0 | CSS | 1Ra Se Op/15M. |
| 8 | AIT | LFH | −10 | CSS | 1Ra Se Op/15M. |
| 9 | AIN | HFH | +10 | LOAD |  |
| 10 | AIN | LFH | 0 | LOAD |  |
| 11 | AIN | HFH | +10 | LOAD |  |
| 12 | AIN | LFH | 0 | LOAD |  |
| 13 | AIN | HFH | +10 | LOAD | 1Ra Se Op/15M. |
| 14 | AIN | LFH | 0 | LOAD | 1Ra Se Op/15M. |
| 15 | AIN | HFH | +10 | LOAD | 1Ra Se Op/15M. |
| 16 | AIN | LFH | 0 | LOAD | 1Ra Se Op/15M. |
| 17 | GIN | CST |  | CONT |  |
| 18 | GIN | CST |  | CONT | 1Ra Se Op/15M. |

TABLE 4

| SAMPLE NUMBER | ERROR RATE ($10^{-6}$) | |
|---|---|---|
|  | BEFORE TEST | AFTER TEST |
| Ex. |  |  |
| 1 | 0.62 | 0.75 |
| 2 | 0.35 | 0.38 |
| 3 | 0.91 | 1.12 |
| 4 | 0.95 | 1.23 |
| 5 | 0.89 | 0.92 |
| 6 | 0.85 | 1.09 |
| 7 | 1.24 | 1.26 |
| 8 | 1.19 | 1.55 |
| 9 | 0.36 | 0.65 |
| 10 | 0.48 | 0.57 |
| 11 | 0.49 | 0.64 |
| 12 | 0.87 | 0.78 |
| 13 | 1.52 | 1.59 |
| 14 | 1.25 | 1.36 |
| 15 | 0.67 | 0.75 |
| 16 | 0.74 | 0.86 |
| 17 | 0.35 | 0.37 |
| 18 | 0.56 | 0.67 |
| 19 | 0.91 | 1.13 |
| 20 | 0.25 | 0.32 |
| 21 | 1.18 | 1.25 |
| 22 | 1.09 | 1.58 |
| 23 | 0.87 | 0.03 |
| 24 | 0.66 | 0.79 |
| 25 | 0.98 | 1.05 |
| 26 | 0.77 | 0.86 |
| 27 | 0.79 | 0.89 |
| 28 | 0.52 | 0.73 |
| 29 | 0.96 | 0.93 |
| 30 | 0.55 | 0.53 |
| 31 | 0.73 | 0.89 |
| 32 | 0.86 | 0.97 |
| 33 | 0.61 | 0.78 |
| 34 | 0.32 | 0.45 |

TABLE 5

| SAMPLE NUMBER | ERROR RATE (× $10^{-6}$) | |
|---|---|---|
|  | BEFORE TEST | AFTER TEST |
| Ex. |  |  |
| 35 | 0.34 | 0.48 |
| 36 | 0.98 | 1.17 |
| 37 | 0.67 | 1.11 |
| 38 | 0.51 | 0.64 |
| 39 | 0.24 | 0.31 |
| 40 | 0.47 | 0.53 |
| 41 | 0.46 | 0.58 |
| 42 | 0.49 | 0.67 |
| 43 | 0.98 | 0.84 |
| 44 | 0.76 | 0.87 |
| Co. Ex. |  |  |
| 1 | 0.35 | 9.78 |
| 2 | 0.27 | x |
| 3 | 0.56 | 4.58 |
| 4 | 0.84 | x |
| 5 | 0.39 | 2.24 |
| 6 | 0.52 | x |
| 7 | 1.04 | 6.85 |
| 8 | 1.12 | x |
| 9 | 0.92 | 3.54 |
| 10 | 0.77 | 9.15 |
| 11 | 0.69 | 4.12 |
| 12 | 0.58 | x |
| 13 | 0.57 | 6.43 |
| 14 | 0.25 | x |
| 15 | 0.57 | 5.82 |
| 16 | 0.36 | 8.71 |
| 17 | 0.39 | x |
| 18 | 0.96 | x |

Co. Ex . . . Comparative Example
x . . . Could not measure

What is claimed is:
1. A magnetic disk device comprising:
a magnetic disk including a CSS region;

a levitation type magnetic head slider;

a controller for controlling the operation of said magnetic head slider and said magnetic disk; and a load/unload mechanism for loading/unloading said magnetic head slider to said magnetic disk when said magnetic disk starts and stops rotating, said controller having a structure that moves said magnetic head slider to the load/unload region of said magnetic disk at a predetermined time interval, reversely rotates said magnetic disk for a predetermined distance and then performs a CSS operation at least once.

2. A magnetic disk device comprising:

a magnetic disk including a CSS region;

a levitation type magnetic head slider;

a controller for controlling the operation of said magnetic head slider and said magnetic disk; and a load/unload mechanism for loading/unloading said magnetic head slider to said magnetic disk when said magnetic disk starts and stops rotating, said controller having a structure that moves said magnetic head slider to the load/unload region of said magnetic disk, reversely rotates said magnetic disk for a predetermined distance and then performs a CSS operation at least once when no access is given to said magnetic disk device in a predetermined time interval.

3. The magnetic disk device according to claim 1 or 2, wherein said predetermined distance is a length of said magnetic head slider or less.

4. The magnetic disk device according to claim 1 or 2, wherein said predetermined time interval is 24 hours or more.

5. A magnetic disk device comprising:

a magnetic disk including a CSS region;

a levitation type magnetic head slider;

a controller for controlling the operation of said magnetic head slider and said magnetic disk; and a load/unload mechanism for loading/unloading said magnetic head slider to said magnetic disk when said magnetic disk starts and stops rotating, said controller having a structure that perform a random seek operation when said magnetic head slider does not access said magnetic disk for at least 15 minutes or more, moves said magnetic head slider to the CSS region of said magnetic disk at a predetermined time interval and then performs a CSS operation at least once, and wherein said predetermined time interval is 24 hours or more.

6. A magnetic disk device comprising:

a magnetic disk including a CSS region;

a levitation type magnetic head slider;

a controller for controlling the operation of said magnetic head slider and said magnetic disk; and a load/unload mechanism for loading/unloading said magnetic head slider to said magnetic disk when said magnetic disk starts and stops rotating, said controller has a structure that performs a random seek operation when said magnetic head slider does not access said magnetic disk for at least 15 minutes or more, moves said magnetic head slider to the CSS region of said magnetic disk and for performs a CSS operation at least once, when no access is given to said magnetic disk device in predetermined time.

7. The magnetic disk device according to claim 6, wherein said predetermined time interval is 24 hours or more.

8. A magnetic disk device comprising:

a magnetic disk including a CSS region;

a levitation type magnetic head slider;

a controller for controlling the operation of said magnetic head slider and said magnetic disk; and a load/unload mechanism for loading/unloading said magnetic head slider to said magnetic disk when said magnetic disk starts and stops rotating, said controller having a structure that performs a random seek operation when said magnetic head slider does not access said magnetic disk for at least 15 minutes or more, moves said magnetic head slider to the CSS region of said magnetic disk at a predetermined time interval, reversely rotates said magnetic disk for a predetermined distance and then performs a CSS operation at least once.

9. A magnetic disk device comprising:

a magnetic disk including a CSS region;

a levitation type magnetic head slider;

a controller for controlling the operation of said magnetic head slider and said magnetic disk; and a load/unload mechanism for loading/unloading said magnetic head slider to said magnetic disk when said magnetic disk starts and stops rotating, said controller having a structure that performs a that performs a random seek operation when said magnetic head slider does not access said magnetic disk for at least 15 minutes or more, moves said magnetic head slider to the CSS region of said magnetic disk at a predetermined time interval, reversely rotates said magnetic disk for a predetermined distance and then performs a CSS operation at least once.

10. The magnetic disk device according to claim 8 or 9, wherein said predetermined distance is a length of said magnetic head slider or less.

11. The magnetic disk device according to claim 8 or 9, wherein said predetermined time interval is 24 hours or more.

* * * * *